April 23, 1940.  E. G. STAUDE  2,198,067
SHEET FEEDER
Filed July 24, 1939  8 Sheets-Sheet 2

INVENTOR
EDWIN G. STAUDE
BY Harold Olsen
ATTORNEYS

April 23, 1940.　　　E. G. STAUDE　　　2,198,067
SHEET FEEDER
Filed July 24, 1939　　　8 Sheets-Sheet 3

INVENTOR
EDWIN G. STAUDE
BY Harold Olsen
ATTORNEYS

April 23, 1940.  E. G. STAUDE  2,198,067
SHEET FEEDER
Filed July 24, 1939   8 Sheets-Sheet 4

INVENTOR
EDWIN G. STAUDE
BY Harold Olsen
ATTORNEYS

April 23, 1940.　　　　　E. G. STAUDE　　　　2,198,067
SHEET FEEDER
Filed July 24, 1939　　　　8 Sheets-Sheet 6

INVENTOR
EDWIN G. STAUDE
BY Harold Olsen
ATTORNEYS

April 23, 1940. E. G. STAUDE 2,198,067
SHEET FEEDER
Filed July 24, 1939 8 Sheets-Sheet 7

INVENTOR
EDWIN G. STAUDE
BY Harold Olsen
ATTORNEYS

April 23, 1940.　　　　　E. G. STAUDE　　　　　2,198,067
SHEET FEEDER
Filed July 24, 1939　　　　8 Sheets-Sheet 8

INVENTOR
EDWIN G. STAUDE
BY Harold Olsen
ATTORNEY

Patented Apr. 23, 1940

2,198,067

UNITED STATES PATENT OFFICE 2,198,067

SHEET FEEDER

Edwin G. Staude, Minneapolis, Minn.

Application July 24, 1939, Serial No. 286,133

27 Claims. (Cl. 271—38)

This invention relates to improvements in sheet feeders, particularly of the type shown in my Patent 2,133,726 dated October 18, 1938.

It has among its objects means whereby the feeder may be quickly changed from bottom feed operation to top feed operation or vice versa.

When used as a top feed device I also provide means including a treadle so that when said treadle is depressed, a series of bars or arms lift the rear of the stack of sheets so that additional sheets may be inserted underneath said stack, and said bars have a smooth top surface so that the additional sheets that are slipped underneath will slide into place more readily on the smooth surface than they would on the rubber carrier belts.

One of the objects of my invention is also to provide it with a means for tilting its feed hopper so as to adapt it for top feeding, or, to level same so as to adapt it for bottom feeding.

A further object is to provide a mechanism to operate the feed belts, on which the stack of sheets rest in the feed hopper intermittently and automatically controlled by a governor finger when used as a top feed device, or, these same belts may be arranged to operate at a proper speed for continuously advancing the blanks through the machine when used as a bottom feed device.

A further object of my invention is to use the same hopper side guides for either top or bottom feeding.

A further object of my invention is to provide a conveniently located adjustment means for the "retard" device when used as a top feeder, said adjustment means extending to the outside of the machine, which eliminates the awkward necessity of reaching underneath the machine to make adjustment of this device as was required on machines of this type heretofore.

Other objects of the invention will appear from the following description and drawings, and which will be further pointed out in the annexed claims.

In the drawings 2 and 3 represent side frames which support my improved feeder. These frames have cross-members or spreaders 4 and 5 which tie the frames 2 and 3 together. The frames 2 and 3 are secured to the frames of a folding machine 6 by suitable plates 7.

Figure 6:
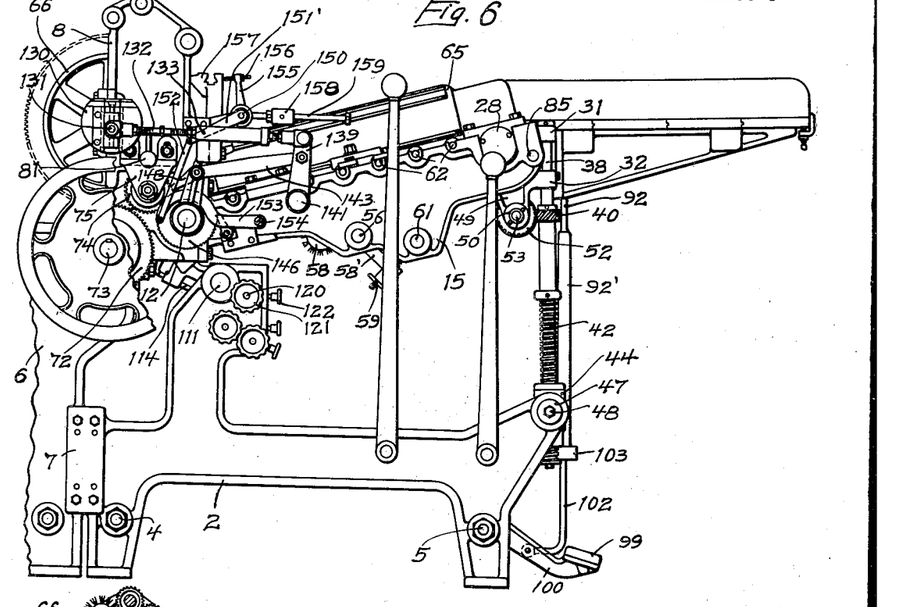
Figure 6 shows a side view of Figure 1, looking towards the left-hand side with the feed hopper adjusted into the top feed position.
Figure 7:
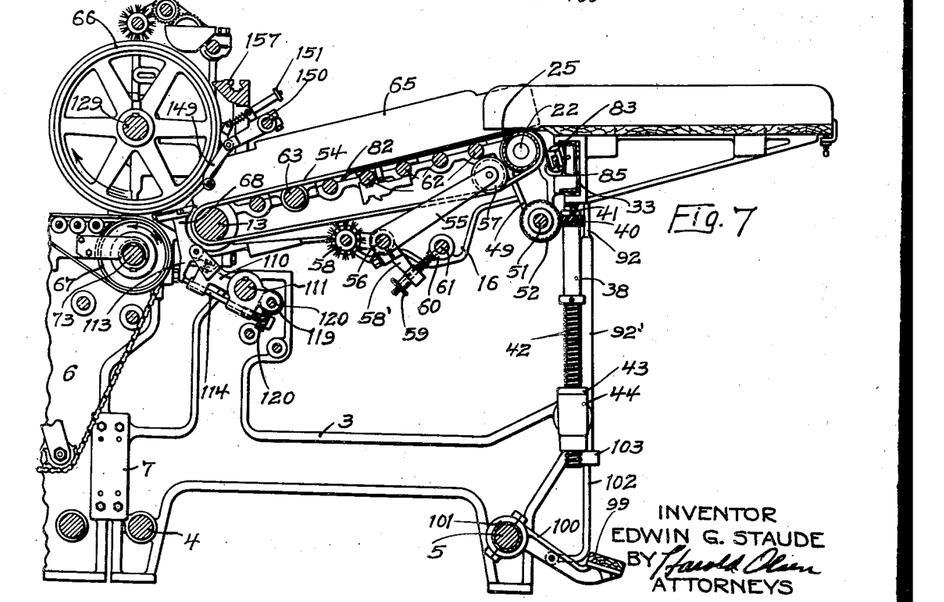
Figure 7 is a vertical section substantially on the line 4—4 of Figure 1, except that in Figure 7 the drawing shows a provision for top feed.

In the drawings, in Figures 6 and 7 I have shown my feeder as attached to a folding and gluing machine, but, of course, the same feeder may be utilized for any other machine that requires a feeder, and therefore I do not limit the application of my invention to a commercial type folding box gluing machine.

Figure 12:
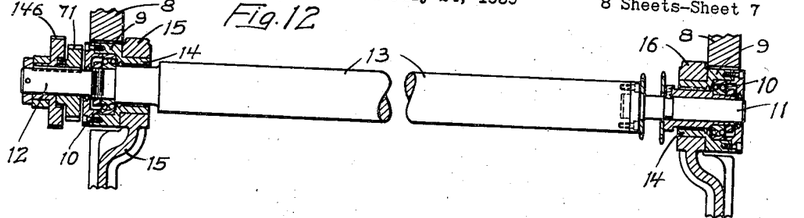
Figure 12 is a detail of the lower carrier belt drive shaft.
Figure 13:
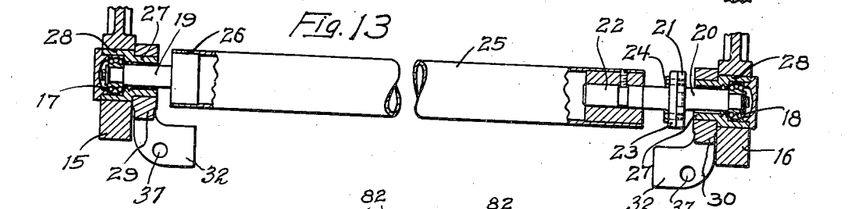
Figure 13 is a detail of the rear idler for the lower carrier belt in the feed hopper.
Figure 17:
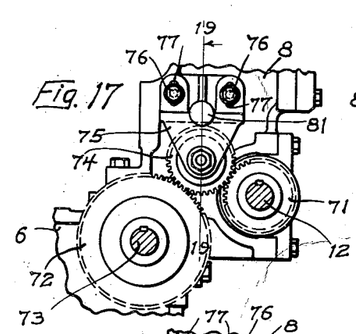
Figure 17 shows the train of gears for driving the lower carrier belt continuously.

Secured to a bracket 8, which is mounted on the folding machine 6 (see Figures 12 and 17), I provide cap members 9 with ball bearings 10, which ball bearings serve to support the journals 11 and 12 of the shaft 13.

The members 9 are provided with an annular extension 14 to provide a concentric hinge bearing for the frames 15 and 16.

The forward end of the frames 15 and 16 is provided with ball bearings 17 and 18 for idler stub shafts 19 and 20. The sub shaft 20 is provided with flanges 21 and is secured to a second stub shaft 22 by flanges 23, using suitable bolts 24. The purpose of this joint is to permit removal of the idler roll 25 which is supported by the stub shafts. The sub shaft 19 is welded to the idler roll 25 at the point 26.

Figure 22:
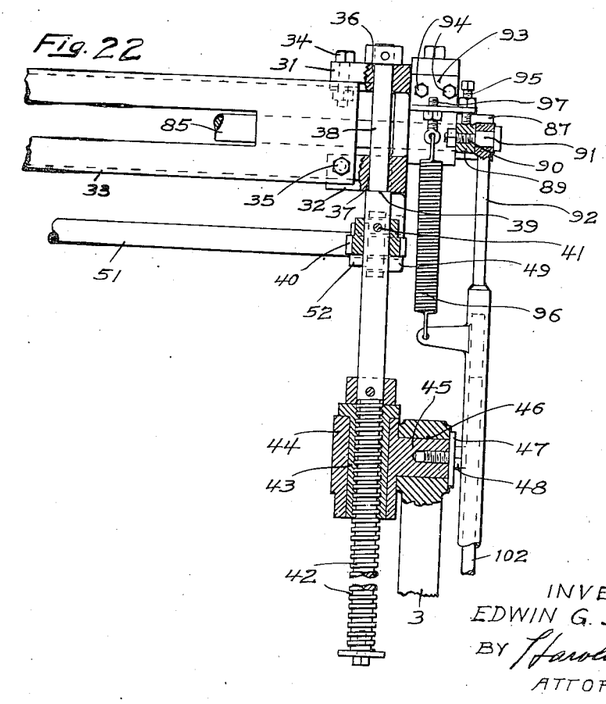
Figure 22 is a detail in elevation of the mechanism for tilting the feed hopper to adapt it for adjustment from bottom to top feed.
Figure 23:
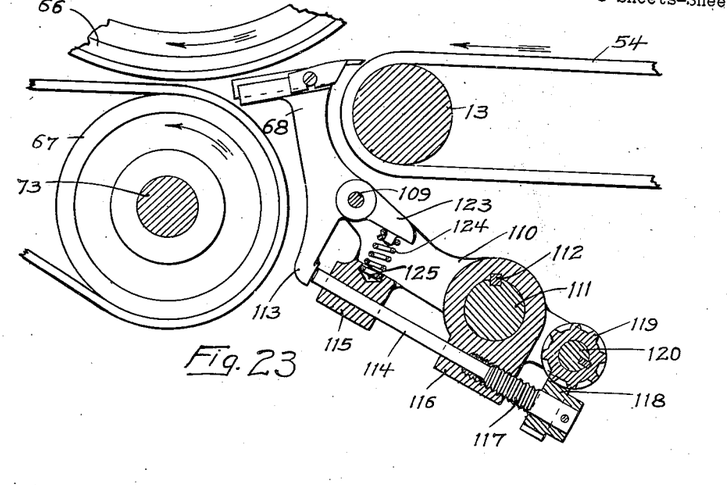
Figure 23 is an enlarged view of my improved retard adjustment mechanism.

A concentric extension 27 is provided on the members 28 that hold the bearings 17 and 18, and is adapted to receive the members 29 and 30. The members 29 and 30 have projections 31 and 32 (see Figure 22) for supporting a channel 33 by suitable bolts 34 and 35. The projections 31 and 32 are also provided with holes 36 and 37 to receive a shaft 38. The shaft 38 has an enlarged portion 39 to act as a thrust against the projection 32 and is provided with a spiral gear 40, which spiral gear is secured to the shaft 38 by a pin 41. The lower part of the shaft 38 is enlarged and threaded at 42 and is provided with an elongated nut 43 in the form of a sleeve which is pressed against rotation in the member 44. The member 44 is provided with a stud 45 adapted to fit in a suitable hole 46 in the frame 3. To hold the stud 45 in position, I provide a washer 47 and secure this by a cap screw 48 threaded into the stud 45.

Figure 1:
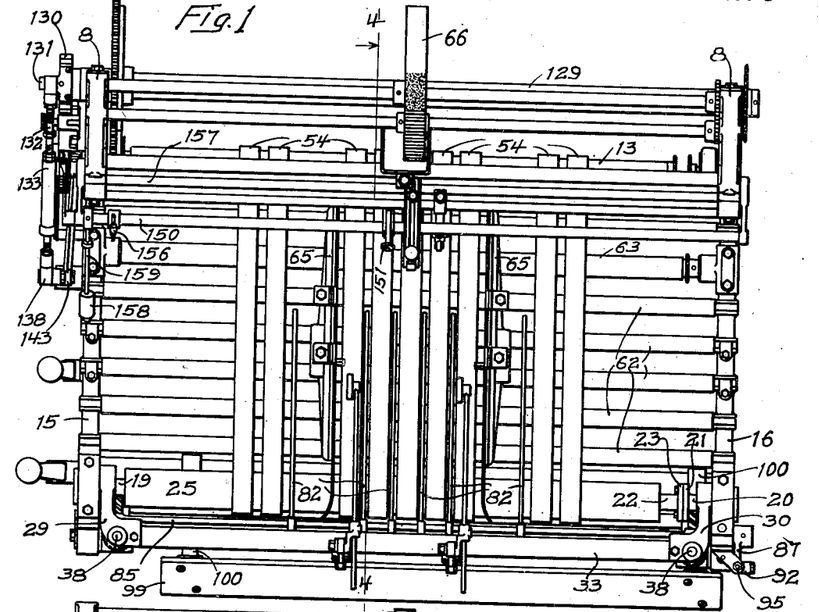
Figure 1 is a top view of my improved combined top or bottom feeding mechanism.
Figure 2:
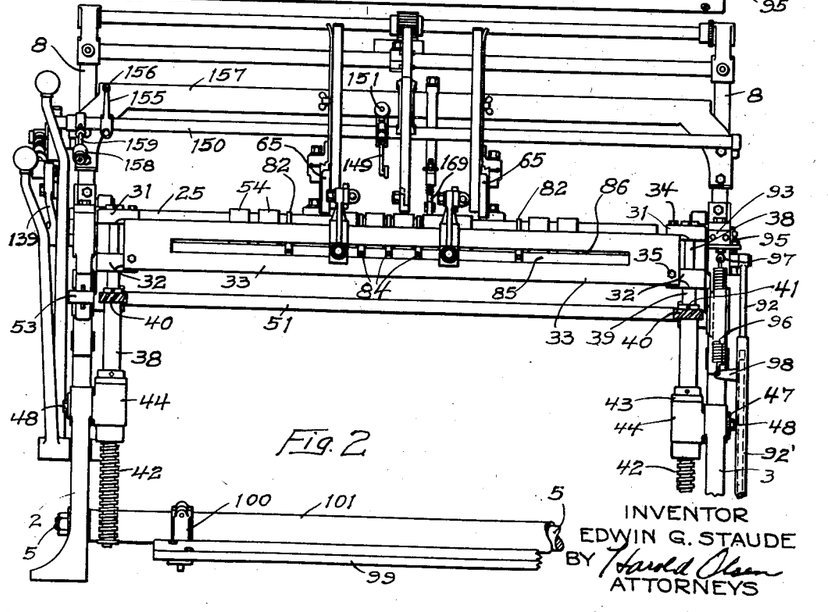
Figure 2 is an end view of Figure 1.
Figure 3:
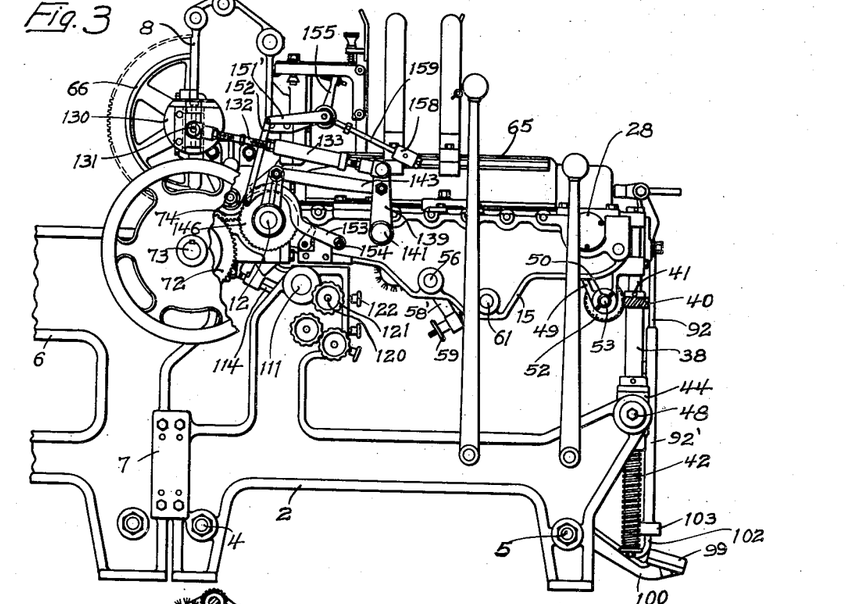
Figure 3 is a side elevation of Figure 1, looking towards the left-hand side of Figure 1.
Figure 4:
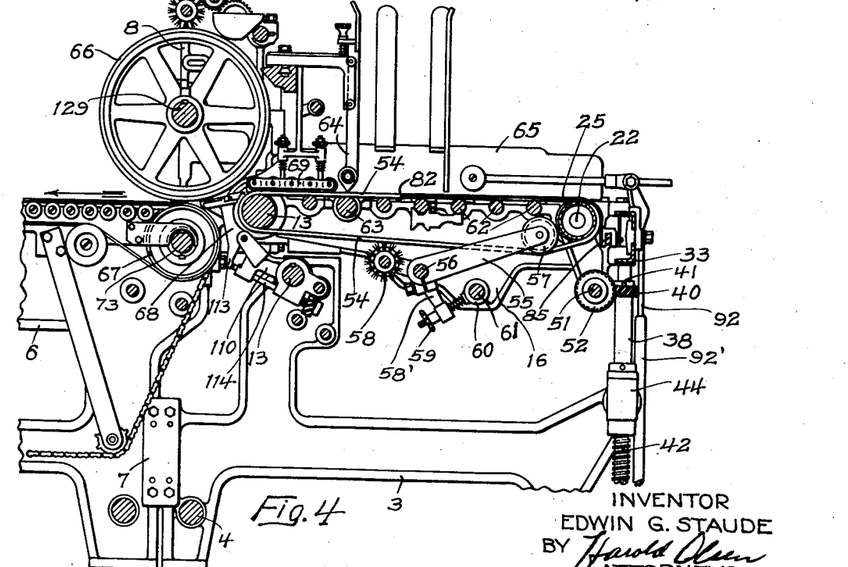
Figure 4 is a section on the line 4—4 of Figure 1 and shows the feed hopper adjusted for bottom feeding.

The members 29 and 30 also have a lug projection 49 provided with a hole 50 adapted to receive a shaft 51, which shaft 51 is provided with a pair of spiral gears 52 meshing with the spiral gears 40. By placing a small crank or handwheel on the extension end 53 of the shaft 51, the shaft 51 may be revolved in either direction and through the medium of the spiral gears 52 meshing into the gears 40, the shafts 38 may be revolved in either direction, and because of the threaded end 42 on the shaft 38 revolving in the nuts 44 (see Figures 2 and 22), the members 15 and 16 may be tilted from the position shown in Figures 3, 4 and 5 into the position shown in Figures 6, 7 and 15, which latter position is preferable when the machine is used for what is known as top feeding, which means taking a single sheet at a time off from the top of the pile in the hopper.

Figure 5:
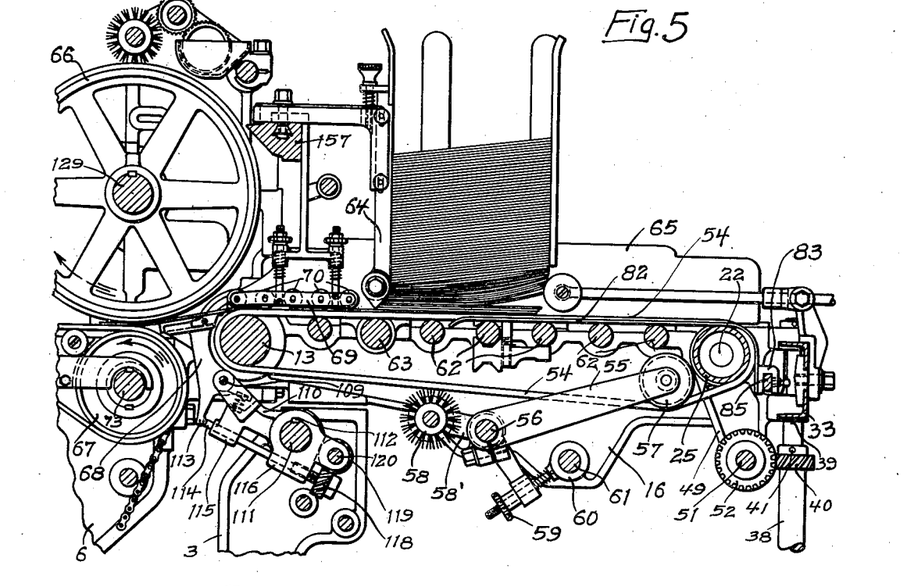
Figure 5 is an enlarged view of Figure 4, and shows the bottom feed with blanks in the hopper and the substantial manner in which the blanks are fed forward through the machine.

Referring again to the underfeed or bottom feed, so called, and particularly to Figure 5, I provide a series of friction belts 54 around the drive shaft 13 and over the idler shaft 25. These belts are usually three or four-ply fabric covered with rubber. In order to control the correct tension on these belts I provide an arm 55 clamped to a shaft 56 and having an idler pulley 57 mounted at its outer end for the purpose of tightening the belts, as shown in Figure 5.

I also provide a driven brush 58 on crank arms 58' which are hinged on the shaft 56 and adjustably connected by a handwheel mechanism 59 to a sleeve 60 which is slidably mounted on the shaft 61. I also provide a series of idler rolls 62 for the upper stretch of the belts 54, to support same in straight line position, while I also provide a large driven roll 63 under the feed gate 64 and side hopper guides 65. I also provide the usual feed wheel 66 coacting with the feed wheel 67 and a retard member 68.

When using the feeding mechanism as a bottom feed, as shown in Figure 5, the distance from the feed gate 64 to that of the contact point between the feed wheel 66 and its coacting member 67 is of considerable distance and would prevent running small cartons. In order to overcome this I provide a truck 69 having a series of rollers 70, which press the small cartons lightly against one of the friction belts 54 to advance said cartons between said feed gate and feed wheels into the point of feeding contact between the feed wheels 66 and 67.

In order to drive the shaft 13, I provide a spur gear 71 on the end 12 of the shaft 13 (see Figure 17), and I also provide a spur gear 72 on the end of the shaft 73 which may be termed the feeder drive shaft. A suitable idler gear 74 connects the spur gears 71 and 72. The idler 74 is mounted in a bracket 75 and secured to the bracket 8 by cap screws 76 fitted in slotted holes 77 and further provided with a plunger device 78 fitting in a hole 79 in the bracket 8, and provided with a spring 80 and a thumbwheel 81. This plunger is for the purpose of registering the correct meshing position of the idler gear 74 with the gears 71 and 72. If I desire to disengage the drive mechanism for bottom feed, I loosen the cap screws 76, pull out on the plunger thumbwheel 81 and raise the bracket 75 into the position shown in Figure 18 and fasten the cap screws in that position with the plunger 78 out of engagement with the hole 79. This is the position shown in Figure 18, that the drive for the bottom feed is in when the feeder is adjusted for overhead or top feed by cranking the shaft 51 and revolving the shafts 38 to raise the rear end of the members 15 and 16 and the parts attached thereto into the elevated position shown in Figures 6 and 7.

Figure 9:
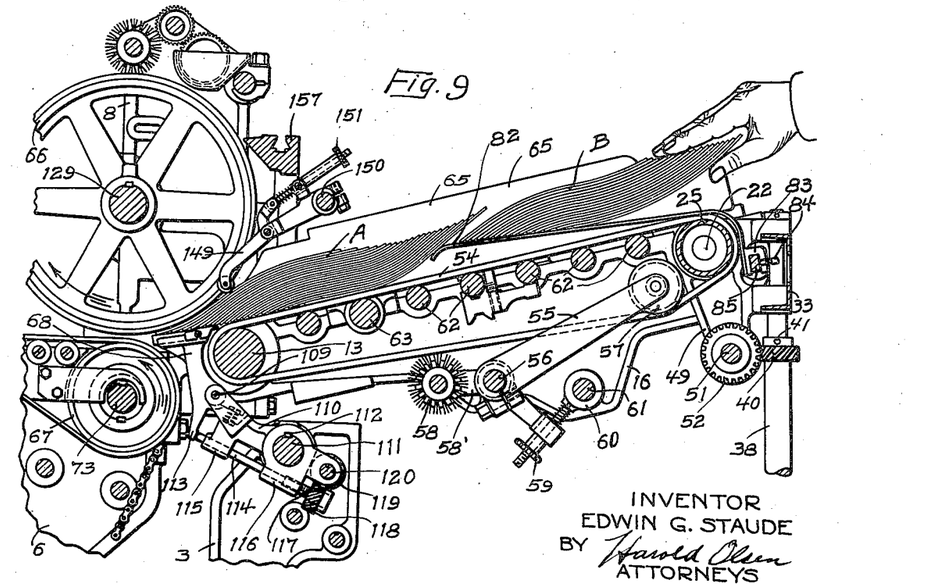
Figure 9 is the same as Figure 8, except that it shows the pedal depressed and the lifting bars have raised the rear of the stack of blanks in the feed hopper so that the next "lift" can be slipped underneath. This operation of lifting the rear of the pile of blanks in the feed hopper so that an additional "lift" may be slid underneath, has always been heretofore accomplished by hand to the best of my knowledge and belief.

When using my improved feeder as a top feed apparatus, I found that it was quite difficult to load the feeder from underneath, as shown in Figure 9, by raising the rear of the pile of blanks by hand and sliding the new "lift" underneath said blanks on the friction belts.

Figure 8:
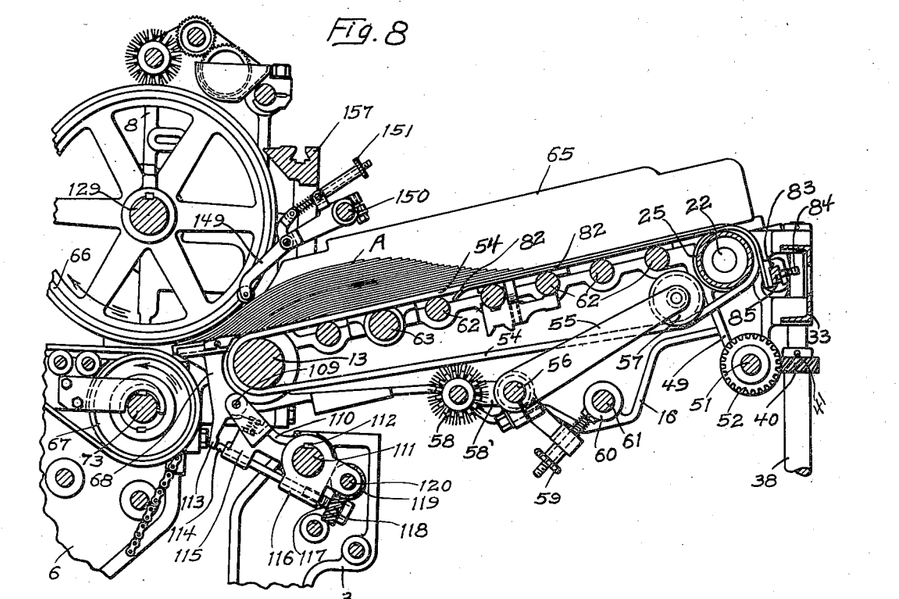
Figure 8 is an enlarged view of Figure 7 and shows blanks placed in the feed hopper and the normal position of the raising bars which, when the pedal is depressed, raise the rear of the stack of blanks in the feed hopper to permit the next "lift" to slide underneath.
Figures 14, 15, 16:
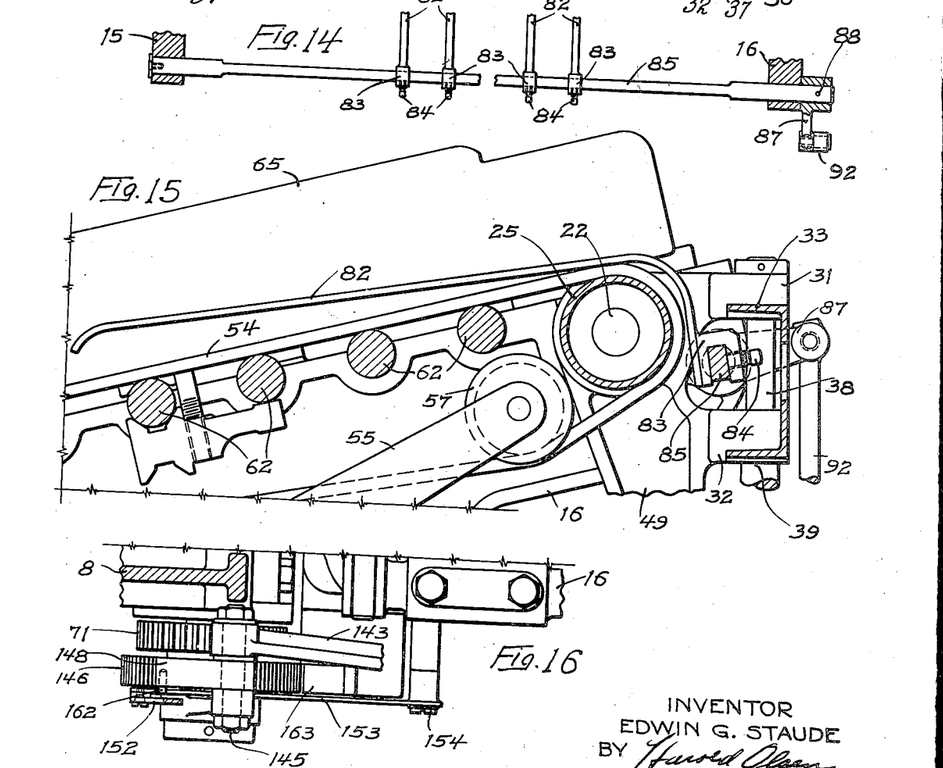
Figure 14 is a detail of the adjustable bars that lift the rear of the stack of blanks in the hopper by depressing the pedal.
Figure 15 shows an enlarged view of a portion of the front of the feed hopper with the lifting bars in raised position when used for top feed.
Figure 16 is a detail of the reciprocating ratchet member for driving the lower carrier belt intermittently.

In order to overcome this difficulty, I now provide a series of lifting bars 82 that normally lie in the spaces between the friction belts 54 (see Figures 8 and 9). I secure the rear of these lifting bars 82 by a recessed member 83 and a set screw 84 to a flat bar 85. The bar 85 is flat for a distance sufficient to allow the lifting bars 82 to be adjusted cross-wise of the machine. I also provide a slot 86 in the channel 33 to provide vision and wrench room for tightening the set screws 84. This bar 85 is shown in Figure 14 and is mounted in bearings in the members 15 and 16, the ends of the bar 85 being round to form journals, and one of said ends is provided with an arm 87 secured to the round end of the bar 85 by a pin 88. The arm 87 is provided with a threaded portion 89 (see Figure 22) adapted to receive a stud 90, which stud 90 has an enlarged portion 91 adapted to pass through a hole in the end of the rod 92. An angle plate 93 is secured to the member 16 by cap screws 94, a projection on same being threaded for a set screw 95, the end of which bears against the arm 87 to provide an adjustable limit stop for said arm. A suitable spring 96 is connected at its upper end to an eye bolt 97 threaded in the angle 93 and at its lower end to a projection 98 on the rod 92.

From the description it is clear that by pulling down on the rod 92 it will tend to rock the bar 85 and raise the lifting bars 82 into the elevated position shown in Figure 9.

In order to cause this rocking movement I provide a treadle 99 mounted on arms 100. The arms 100 are in turn clamped to a sleeve 101, which sleeve is loosely mounted on the spreader shaft 5 (see Figure 7). Pivotally secured to the arms 100, I provide a rod 102 which telescopes into the tubular lower end 92' of the rod 92. The lower end 92' of the rod 92 is provided with a projection 103 and a thumb-screw clamping arrangement which consists of a headless bolt 104 having a semi-circular depression 105 to permit inserting the rod 102, and by tightening up the wing nut 106, a clamping action is obtained.

As a limit stop for the treadle 99 and arms 100, I provide an angle plate 107 secured to the frame member 3, and provide the angle plate with a set screw arrangement 108. The lower end of this set screw bears against the arm 100 and limits its upward movement against the tension of the spring 96.

Referring to Figure 9, in using my improved feeder as a top feeder I provide a retard member 68, but because of the difficulty of adjusting the conventional retard, which calls for an awkward reach of the operator, or even crawling under the machine, I provide a new and improved adjustment mounting which consists of pivoting the member 68 at the point 109. The pivot 109 is provided on a bracket 110 secured to the fixed spreader shaft 111 by a key 112. This construction causes the bracket 110 to remain in rigid position at all times.

The member 68 has a depending arm 113 and is adjusted by a rod 114 having bearings in depending lugs 115 and 116, which lugs are a part of the bracket 110. At the opposite end of the rod 114, I mount a threaded member 117 provided with a spiral gear 118. The spiral gear 118 meshes with another spiral gear 119 which is slidably mounted on the shaft 120 but splined so as to be revolved with the shaft 120. The shaft 120 is provided at its outer end with a hand-wheel 121 and a thumbscrew 122. In order to keep the depending arm 113 on the retard member 68 against the end of the rod 114, I provide another arm 123 on the member 68 and a compression spring 124 is arranged between the arm 123 and a recess 125 in the member 115.

In the mechanism just described the adjustment of the retard is obtained by first releasing the thumb screw 122 which clamps the shaft 120, and then revolving the hand-wheel 121 in the desired direction, which will in turn rotate the shaft 120 and the spiral gears 119 and 118 and thus the rod 114 is advanced through the action of the threaded member 117. As the rod 114 is advanced against the arm 113 it will tilt the upper end of the retard member 68 toward the feed wheel 66.

Figure 18:
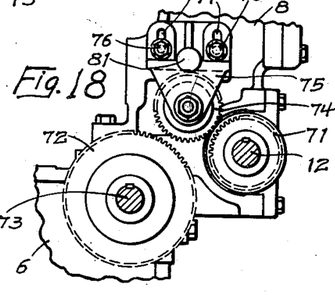
Figure 18 shows the position of the intermediate gear when the lower carrier belts are driven intermittently.
Figures 19, 20, 21:
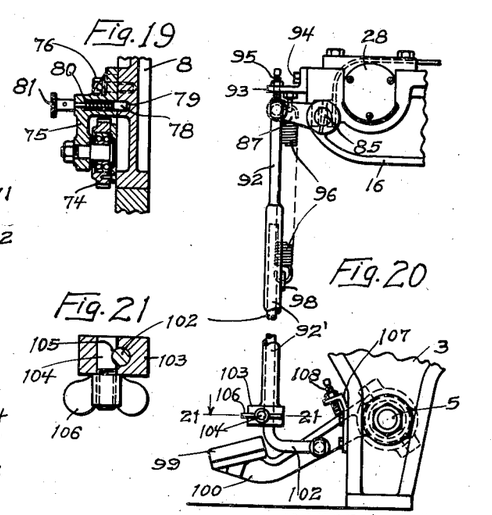
Figure 19 is a detail of the intermittent gear and the adjustable mounting therefor, taken on line 19—19 of Figure 17.
Figure 20 is a detail showing the connection between the lifter bar mechanism and the treadle and the thumb-wheel arrangement so as to provide adjustment when the feeder is set for bottom feed in the horizontal position and top feed when it is tilted.
Figure 21 is a cross-section 21—21 of Figure 20 and shows the thumb-screw clamping arrangement to hold the telescope adjustment in position.

When using my improved feeder as a top feed apparatus, I disconnect the drive gears 71, 72 and 74, as shown in Figure 18, and on the feed wheel shaft 129, on the outside of the bracket 8, I provide a disc 130, which disc is provided with a radially adjustable crank pin 131, and a connecting rod 132 extends into a tube 133 which is threaded to the end of the connecting rod 132 and secured by a jam-nut 134. Within the tube 133, I provide a spring 135 adapted to bear against a head 136 of the plunger 137, which is in turn threaded and secured by a jam-nut into a forked member 138 connected to an arm 139 by a stud 140. The arm 139 is pivoted to the frame member 15 at 141 and is provided with a stud 142, and a connecting link 143 which in turn is connected to an arm 144 by a stud 145, said arm being pivoted on the shaft member 12. The shaft member 12 also is provided with a ratchet wheel 146 keyed to said shaft, the same as the spur gear 71. The ratchet wheel 146 is provided with a series of small ratchet teeth 147 which are engaged by a pawl 148, and said pawl is also pivoted on the same stud 145 that connects the arm 144 to the link 143.

From the description just given it is clear that as the crank pin 131 is adjusted to deliver the proper stroke to the rod 132, it will transmit reciprocating motion to the arm 139.

Any sudden shock or over-running is eliminated by the proper tension on the spring 135 within the tube 133. This may be further adjusted by relieving the jam-nut 134 and turning the tube 133 in a direction to cause the rod 132 to bear against the head 136 and compress the spring 135 to a greater degree if required.

Figure 11:
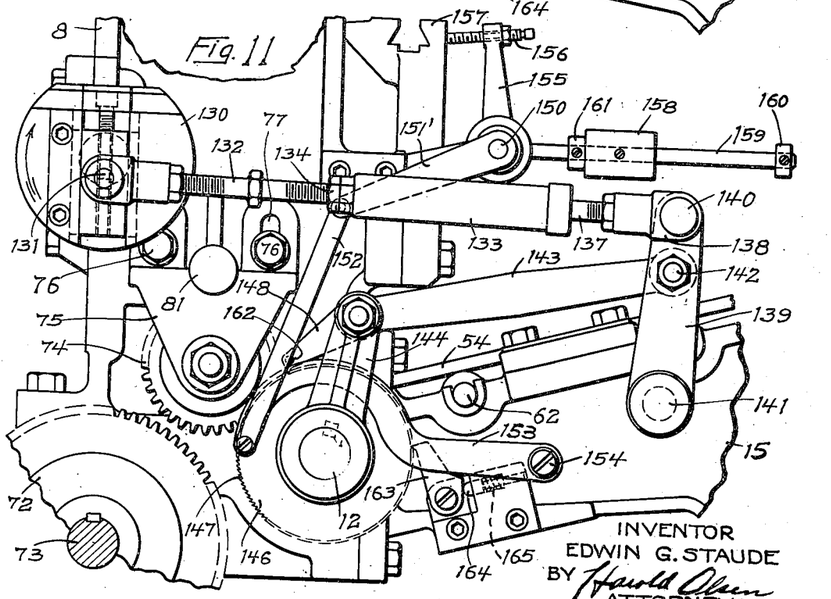
Figure 11 is a similar view to Figure 10, except that it shows the position of the lower carrier belt drive disengaged from the continuous motion and the pawls engaged in the ratchet for intermittent motion.

The oscillating motion of the forked member 138, through the connecting link 143, will oscillate the arm 144 (see Figure 11). The pawl 148, being mounted on the arm 144 at the point 145 and free to drag with the forward end over the ratchet teeth 147, will in turn advance the ratchet wheel 146 and through the member 12, which is a part of the shaft 13, will in turn give intermittent motion to the shaft 13, and since this shaft drives the belts 54, it will advance step by step the pile of blanks shown in Figure 8.

In order that over-feeding or jamming of the pile into the throat between the feed wheel 66 and the retard member 68 will not occur, I provide a feed control arm 149 (see Figure 9) clamped on a rock shaft 150. The arm 149 is adjustable towards and away from the pile of blanks shown at A (see Figure 9) by means of a thumb-nut 151. The shaft 150 is provided at its outer end by an arm 151' (see Figures 10 and 11). The end of the arm 151' is pivotally connected to a link 152 which in turn is connected to a curved member 153, which curved member is pivoted at 154 on the frame 15. The curved upper edge of the member 153 is of substantially the same radius as the periphery of the ratchet wheel 146 and is normally disposed above the teeth 147 of said ratchet wheel. A suitable limit stop is provided by the arm 155 secured to the shaft 150, and its adjustment controlled by a set screw 156, the set screw bearing against a spreader bar 157 which extends across the machine. Because the pressure of the feed control arm 149 against the top of the carton pile A must be very light, I provide a counter-balance consisting of a weight 158 adapted to slide on a rod 159, which rod is secured to the shaft 150. Suitable limit collars 160 and 161 are provided so that when the weight is shifted to the left, as shown in Figure 11, it being previously located in the over-balanced position shown in Figure 10, permits the feed control arm 149 to bear on the top surface of the cartons so that through the adjustment 151, when the pile of cartons A becomes too thick, it will rock the shaft 150 and raise the arm 151' and the connecting link 152, causing the curved member 153 to raise the pawl 148 out of contact with the ratchet teeth 147 by engaging a pin 162 at the end of the pawl 148, which pin will then ride on the curved upper surface of the member 153, as shown in Figure 10.

In order to keep the ratchet wheel 146 from turning backward, I provide a pawl 163 (see Figure 11), which is held in contact with the ratchet wheel by an offset plunger 164 and a concealed compression spring 165. When it is desired to dispense with intermittent feed, just described, and to adjust the feeder for bottom feed, all that is necessary is to move the weight member 158 against the collar 160 which will then over-balance the control mechanism 149 and cause same to permanently hold the pawl member 148 out of contact with the ratchet teeth 147, even though the reciprocating mechanism continues to operate.

Figure 10:
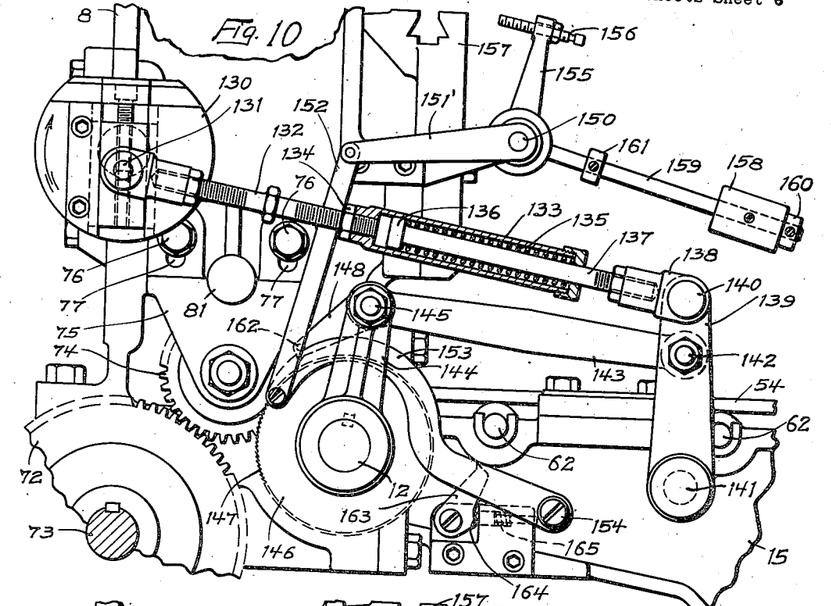
Figure 10 is an enlarged view of the mechanism for advancing the carrier belt in the bottom of the feed hopper continuously, which position is required when using the bottom feed. This view shows the continuously moving drive gear in mesh, and the pawls for advancing the blank intermittently out of contact with the ratchet.

In order to prevent unnecessary wear on the surface of the ratchet wheel by the pawl 163, said pawl is moved over into the position shown in Figure 10 where it is held out of ratcheting contact during bottom feeding operation. When the reciprocating mechanism is made inoperative as shown in Figure 10, then the idler gear 74 may again be put into contact with the gears 71 and 72, as shown in Figure 17 and Figure 10, to again adapt the apparatus for bottom feeding.

In this embodiment of my invention motion of the belts or conveyor 54 is controlled to be either started or dropped and also to be moved at varying speeds by the stroke adjustment of the crank pin 131. The starting and stopping are controlled by the ratcheting mechanism governed by a pilot which moves conformably to the depth of the piled sheets at the feeding means. When this depth becomes greater than it should, the pawl 148 is lifted so that the feeding belt 54 stops moving until enough of the sheets have been removed from the top of the stack by the feeding means. When a sufficient number of sheets have been removed the pawl is lowered and the feed belt is again operated to advance the stack. The expression "driving the conveying means at varying speeds" is construed to mean variation from zero speed to the desired speed, or to mean intermittent driving of the belt, in one instance to stop, in the other instance to start the belt. This explanation is made because the belt may move constantly and yet at varying speeds, as distinguished from moving intermittently, that is, from moving and then stopping altogether. There is no intention, therefore, to be limited in regard to whether the belt constantly moves at different speeds, or stops altogether and then starts again, at some desired speed.

Referring to Figures 8 and 9, I have shown in Figure 8 the manner in which the top feed is used. In top feed practice a "lift" of blanks are "feathered" out, so that the sheets are forwardly overlapped, and placed in the hopper between the same side guides 65 that are used for bottom feeding. The front edges of the pile of blanks A will then slide forward into contact with the belts 54, while said belts will intermittently advance the overlapped blanks A against the feed wheel 66, said feed wheel having a friction surface which engages the front edge of the top blank and pulls same past the retard 68, which will prevent the passing of more than the one blank through its close-up adjustment, and the intermittent advance of the blanks on the friction belts 54 will be controlled by the feed control arm 149, as hereinbefore described.

When the operator desires to replenish the hopper, he steps on the treadle to cause the lifting bars 82 to raise the rear of the blanks in the pile A sufficiently so that when the new "lift" is "feathered out" or "overlapped", as shown at B, he can easily slide the new "lift" B underneath the "lift" A in the hopper due to the fact that the lifting bars 82 keep the forward edges of the "lift" B away from the friction top surface of the feed belts 54.

I consider this a very important feature, because it greatly adds to the ease and simplicity of replenishing the feed hopper when the top feed position of my feeder mechanism is being used.

I claim:

1. A sheet feeding apparatus comprising an adjustably inclined hopper for supporting a pile of forwardly overlapped sheets, a feeding wheel provided with a friction surface to contact the topmost sheet at the forward end of said pile, a friction retard device cooperating with said feeding wheel to permit the passage of only one sheet at a time, sheet lifting means pivoted on the rear part of said hopper and having a forward portion spaced from said retard device, a treadle, and connections between said treadle and said sheet lifting means whereby pressure on said treadle will raise said lifting means and the rear of said pile and hold said means and pile in lifted positions to permit another overlapped pile to be placed underneath the rear of said first named pile.

2. A sheet feeding apparatus comprising an adjustable hopper for supporting a stack of sheets in position to be fed, feed belts arranged in the bottom of said hopper to receive the stack, means for driving said feed belts continuously, means for driving said belts intermittently, means selectively adjustable for operating either driving means independently of the other, and means for tilting said hopper from a horizontal to an inclined position.

3. A sheet feeding apparatus comprising an adjustable hopper for supporting a stack of sheets in position to be fed, feed belts arranged in the bottom of said hopper, means for driving said belts at continuous speed, means for driving said belts at intermittent speed, means selectively adjustable for operating either driving means independently of the other, means for tilting said hopper from a horizontal position to an inclined position, a stack thickness control mechanism for automatically governing the feed belt speed when said intermittent driving means is operative, and a treadle-controlled means for lifting the rear of said stack to permit replenishing from beneath it.

4. A sheet feeding apparatus comprising an adjustably inclined hopper for supporting a pile of forwardly overlapped sheets, feed belts arranged in the bottom of said hopper, a feeding wheel provided with a friction surface in contact with the topmost sheet at the forward end of said pile, a friction retard device cooperating with said feeding wheel to permit the passage of said top sheet only, a mechanism for intermittently driving said belts to automatically advance said pile against said feeding wheel, a feed control means adapted to yieldingly contact the uppermost sheet of said pile for automatically controlling the intermittent travel of the said feed belts, a pile lifting means located at the rear edge and underneath said pile of sheets, and a treadle for operating said pile lifting means to raise the rear of said pile and to hold it raised to permit replenishing from beneath.

5. A sheet feeding apparatus comprising an adjustably inclined hopper hinged at its forward end, a conveyor in said hopper for supporting a pile of forwardly overlapped sheets, a feeding wheel arranged forwardly of said hopper and provided with a friction surface to engage the topmost sheet at the forward end of said pile, an adjustable retard device disposed immediately below said feeding wheel to permit passage of only one of said sheets at a time, adjustable means for supporting the rear end of said hopper at any desired position and consisting of a pair of vertically disposed rods hinged at their upper end to said hopper and having screw threaded connections by which said rods may be simultaneously raised or lowered to raise or lower the rear end of said hopper.

6. A sheet feeding apparatus comprising an adjustably inclined hopper hinged at its forward end, a conveyor in haid hopper for supporting a pile of forwardly overlapped sheets, a feeding wheel arranged to receive sheets from the conveyor of said hopper and provided with a friction surface to engage the topmost sheet at the forward end of said pile, an adjustable retard device disposed immediately below said feeding wheel to permit passage of only one of said sheets at a time, and means including arms pivoted by their outer ends to a point adjacent the receiving end of said conveyor for lifting the rear edge of said pile of sheets to allow another pile of overlapped sheets to be conveniently placed on said conveyor beneath the rear of said first named pile.

7. A sheet feeding apparatus comprising an adjustably inclined hopper hinged at its forward end, a conveyor in said hopper for supporting a pile of forwardly overlapped sheets, a feeding wheel arranged near said hopper and provided with a friction surface to engage the topmost sheet at the forward end of said pile, an adjustable retard device disposed immediately below said feeding wheel to permit passage of only one of said sheets at a time, and treadle actuated means on said hopper for lifting the rear edge of said pile of sheets to allow another pile of overlapped sheets to be conveniently placed on said conveyor beneath the rear of said first named pile.

8. A sheet feeding apparatus comprising an adjustably inclined hopper hinged at its forward end, a conveyor in said hopper for movably supporting a pile of forwardly overlapped sheets, means for operating said conveyor, a feeding wheel arranged near the hinged end of said hopper and provided with a friction surface to engage the topmost sheet at the forward end of said pile, an adjustable retard device disposed immediately below said feeding wheel to permit passage of only one of said sheets at a time, means extending from said retard device to a point near the outside of said hopper to allow convenient adjustment of said retard device, and means for supporting the rear end of said hopper at any desired inclined position.

9. A sheet feeding apparatus comprising an adjustably inclined hopper hinged at its forward end, a conveyor in said hopper for supporting a pile of forwardly overlapped sheets, a feeding wheel arranged to receive sheets from the conveyor of said hopper and provided with a friction surface to engage the topmost sheet at the forward end of said pile, an adjustable retard device disposed immediately below said feeding wheel to permit passage of only one of said sheets at a time, and means for operating the conveyor so as to carry said pile toward said feeding wheel.

10. A sheet feeding apparatus comprising means for receiving and advancing sheets, means for conveying sheets to said receiving means for advance thereby, first means for simultaneously driving said receiving means at constant speed and said conveying means at varying speeds, including parts adjustable for stopping said variable speed driving while said receiving means continues to be driven, and second means for driving said conveying means independently at constant speed, including means adjustable for establishing a driving connection by which said conveying means is driven at such constant speed when said adjustable parts are adjusted for stopping variable speed driving.

11. A sheet feeding apparatus comprising, means for receiving and advancing sheets, means for conveying sheets to said receiving means for advance thereby, first means for simultaneously driving said receiving means at constant speed and said conveying means at varying speeds, including parts adjustable for stopping said variable speed driving while said receiving means continues to be driven, and second means for driving said conveying means independently at constant speed, including means adjustable for establishing a driving connection by which said conveying means is driven by the means which drives said receiving means at such constant speed, when said adjustable parts are adjusted for stopping variable speed driving.

12. A sheet feeding apparatus comprising a constant speed main drive shaft, a second shaft driven by the main shaft, means for receiving and advancing sheets and driven by said second shaft, a third shaft, means for conveying sheets to said receiving means and driven by said third shaft, means by which the second shaft drives the third shaft at variable speeds, including parts adjustable for stopping said variable speed driving while the second shaft continues to drive the receiving means, and means adjustable for establishing a direct driving connection between the main shaft and the third shaft which is operable to drive said shaft when said adjustable parts are adjusted for stopping variable speed driving.

13. A sheet feeding apparatus comprising a constant speed main drive shaft, a second shaft driven by the main shaft, means for receiving and advancing sheets and driven by said second shaft, a third shaft, means for conveying sheets to said receiving means and driven by said third shaft, means by which the second shaft drives the third shaft at variable speeds, including parts adjustable for stopping said variable speed driving while the second shaft continues to drive the receiving means, one of said parts comprising a weight adjustable to a position at which it acts to hold the other parts positioned for stopping variable speed driving, and means adjustable for establishing a direct driving connection between the main shaft and the third shaft which is operable to drive said third shaft when said parts are adjusted for stopping variable speed driving.

14. In combination with means for receiving and advancing sheets, a frame having thereon means for conveying sheets to said receiving means, means by which said frame can be adjusted to cause said conveying means to slant downwardly and forwardly toward said feeding means, and means on the frame for raising and holding the rear end of a pile of sheets which rest on said conveyor.

15. In combination with means for receiving and advancing sheets, a frame having thereon means for conveying sheets to said receiving means, means by which said frame can be adjusted to cause said conveying means to slant downwardly and forwardly toward said receiving means, means for driving the conveying means while said frame is in any adjusted position, and means on the frame for raising and holding the rear end of a pile of sheets which rest on said conveying means.

16. A sheet feeding apparatus comprising, feeding means, a pivoted frame, conveying means on said frame, means for driving said conveying means while the frame is tilted to cause said conveying means to slant downwardly toward said feeding means, sheet lifting means on said frame, and means for operating the lifting means to raise the rear end of a pile of sheets which is on said conveying means, and to hold said lifting means in lifting position while another lapped pile is placed underneath the raised end of the first pile.

17. A sheet feeding apparatus comprising, feeding means, a frame, driving belts on said frame, means for driving the belt while the frame is tilted to cause said conveying means to slant downwardly toward the feeding means, sheet lifting means pivoted on said frame, and means for operating the lifting means to raise the rear end of a pile of sheets which is on said belts, and adapted to hold said lifting means in lifting position while another lapped pile is placed underneath the raised rear end of the first pile.

18. In combination with means for receiving and advancing sheets, a frame having thereon means for conveying sheets to said receiving means, means by which said frame can be adjusted to cause said conveying means to slant downwardly and forwardly toward said receiving means, means for driving the conveying means while said frame is in any adjusted position, means on the frame for raising and holding the rear end of a pile of sheets which rest on said conveying means and comprising a series of arms pivoted by their rear portions to the rear portion of said frame so that their forward ends may be raised, and means for raising and holding said arms.

19. A sheet feeding apparatus which has driven feed belts adapted to bodily advance a pile of forwardly overlapped sheets or to advance a sheet from the bottom of a stationary pile into feeding relation with a rotary feed wheel, said belts being mounted on a frame which can swing about an axis which is near said rotary wheel to tilt the belts to downwardly slant toward said feed wheel, means on said frame adapted to lift and hold lifted the rear portion of a pile of sheets to permit the forward portion of a second pile to be placed thereunder and upon the belts, and means by which said lifting means is adjustable transversely conformably to the varying width of sheets to be advanced by said belts.

20. In a sheet feeding apparatus having a frame, and having a feeding wheel provided with a friction surface adapted to contact the topmost sheet of a pile of forwardly overlapped sheets to feed the same, means for supporting a pile of such forwardly overlapped sheets and moving them toward said feeding wheel, a friction retard device to which said last mentioned means delivers, said retard device cooperating with the feeding wheel to permit the passage of only one sheet at a time, means rockably pivoting said retard device and means for adjustably moving said device on its pivoting means, including a shaft extending transversely of said frame and accessible at the side of said frame for adjusting rotations.

21. In a sheet feeding apparatus having a frame, and having a feeding wheel provided with a friction surface adapted to contact the topmost sheet of a pile of forwardly overlapped sheets to feed the same, means for supporting a pile of such forwardly overlapped sheets and moving them toward said feeding wheel, a friction retard device to which said last mentioned means delivers, said retard device cooperating with the feeding wheel to permit the passage of only one sheet at a time, means rockably pivoting said retard device and means for adjustably moving said device on its pivoting means, including a shaft extending transversely of said frame and accessible at the side of said frame for adjusting rotations, said adjusting means including a stem adapted to move axially when rotated and engaging said retard device to rock it when the stem is moved axially, and gears operated by said shaft and adapted to rotate said stem when said shaft is rotated.

22. In combination with, means for receiving and advancing sheets, a first drum near said means, a belt for conveying sheets toward said advancing means and being driven at its forward end by said first drum, a hopper having a second drum supporting the rear of the belt, said belt being within the hopper, means adapting the hopper to swing about an axis which coincides with an axis of rotation of the first drum, and means for swinging the hopper and its belt about the axis of the first drum and holding the same in adjusted positions.

23. A sheet feeding apparatus comprising a first main shaft, a conveyor operated by said first shaft, a second shaft operating feeding means to deliver sheets to said conveyor, a third shaft and a conveyor operated thereby for advancing sheets into feeding relation with the feeding means, means by which the second shaft drives the third shaft intermittently conformably to the thickness of the stacked sheets at a point near the feeding means, including parts adjustable for stopping drive of the third shaft by the second while the second shaft continues to drive the feeding means, and means adjustable for establishing a direct driving connection between the first and third shafts when said adjustable parts are adjusted for interrupting the drive between the second and third shafts.

24. A sheet feeding apparatus comprising a first main shaft, a conveyor operated by said first shaft, a second shaft operating feeding means to deliver sheets to said conveyor, a third shaft and a conveyor operated thereby for advancing sheets into feeding relation with the feeding means, a reciprocating mechanism by which the second shaft drives the third shaft, including means for adjustably varying the length of the stroke of the reciprocating mechanism, and including parts adjustable for stopping driving action of said reciprocating mechanism on the third shaft while the second shaft continues to drive the feeding means, and means adjustable for establishing a direct driving connection between the first and third shafts when said reciprocating mechanism is rendered inoperative.

25. A sheet feeding apparatus comprising a first main shaft, a conveyor operated by said first shaft, a second shaft operating feeding means to deliver sheets to said conveyor, a third shaft and a conveyor operated thereby for advancing sheets into feeding relation with the feeding means, a reciprocating mechanism by which the second shaft drives the third shaft, including a driving ratchet wheel for the third shaft, a pawl for said ratchet wheel, a crank operated by the second shaft, and means by which the crank reciprocates the pawl to drive the ratchet wheel, and including parts adjustable for preventing action of the pawl on its wheel, and therefore for preventing driving action of said recprocating mechanism on said third shaft, while the second shaft continues to drive the feeding means, and means adjustable for establishing a direct driving connection between the first and third shafts when said reciprocating mechanism is rendered inoperative.

26. A sheet feeding machine comprising a first main drive shaft, a second drive shaft driven by the first shaft, means operated by the second shaft for feeding sheets, a third shaft, means driven by the third shaft for conveying sheets to be acted upon by the feeding means, a reciprocating mechanism by which the second shaft drives the third, substantially all of the parts of the said reciprocating mechanism being accessibly arranged at the outer side of one of two side frames of the machine, and including a crank disk on the outer end of the second shaft, said disk having a crank pin and means for adjusting it to change the cranking stroke, a ratchet wheel on the third shaft and a pawl for driving the ratchet wheel to advance the conveyor and the sheets thereon, means by which the crank reciprocates the pawl, and means for independently moving the pawl to and holding it in inoperative position.

27. A sheet feeding machine comprising a first main drive shaft, a second drive shaft driven by the first shaft, means operated by the second shaft for feeding sheets, a third shaft, means driven by the third shaft for conveying sheets to be acted upon by the feeding means, a reciprocating mechanism by which the second shaft drives the third, substantially all of the parts of the said reciprocating mechanism being accessibly arranged at the outer side of two side frames of the machine, and including a crank disk on the outer end of the second shaft, said disk having a crank pin and means for adjusting it to change the cranking stroke, a ratchet wheel on the third shaft and a pawl for driving the ratchet wheel to advance the conveyor and the sheets thereon, means by which the crank reciprocates the pawl, including two members forming a link, and means allowing a resilient yielding separation between said members during a reciprocation in a direction which causes the pawl to advance the ratchet wheel, and means for independently moving the pawl to and holding it in inoperative position.

EDWIN G. STAUDE.